No. 709,256. Patented Sept. 16, 1902.
E. R. BUTTS.
HARROW.
(Application filed June 7, 1901.)
(No Model.)
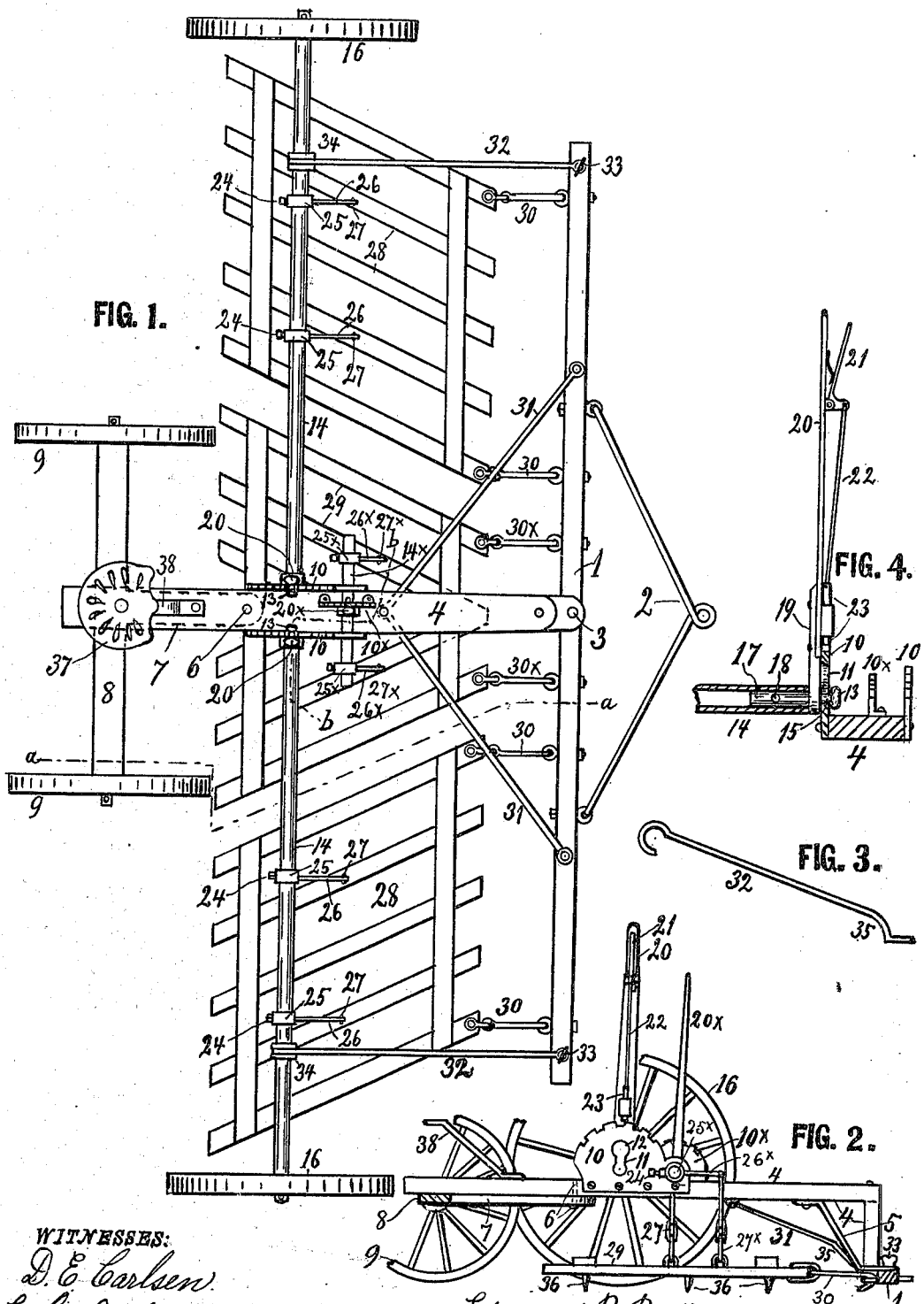
WITNESSES:
D. E. Carlsen
E. C. Carlsen
Edmund R. Butts, INVENTOR.
BY his ATTORNEY A. M. Carlsen.

UNITED STATES PATENT OFFICE.

EDMUND RANDEL BUTTS, OF OBERON, NORTH DAKOTA.

HARROW.

SPECIFICATION forming part of Letters Patent No. 709,256, dated September 16, 1902.

Application filed June 7, 1901. Serial No. 63,495. (No model.)

*To all whom it may concern:*

Be it known that I, EDMUND RANDEL BUTTS, a citizen of the United States, residing at Oberon, in the county of Benson and State of North Dakota, have invented certain new and useful Improvements in Drags or Harrows; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in harrows, and especially to the class of harrows often termed "drags."

The objects and the special features of the invention will be fully pointed out in the specification and claims below.

In the accompanying drawings, Figure 1 is a top or plan view of my complete drag or harrow. Fig. 2 is a sectional side elevation on the line $a\ a$ in Fig. 1 with the yoke 2 and right-hand shaft 14 and its lever 20 omitted. Fig. 3 is a side view of one of the braces 32 in Fig. 1. Fig. 4 is a partly-sectional view about as on the line $b\ b$ in Fig. 1.

Referring to the drawings by reference-numerals, 1 is the draft-bar and is provided with the yoke or large clevis 2 for hitching a team to. To the center of this draft-bar is bolted at 3 the upwardly and rearwardly extending frame-bar 4, which at its front angle is strengthened by the brace 5, while under its rear part is pivotally secured at 6 a horizontally-swinging arm or short tongue 7, at the rear end of which is secured the axle 8, carried by the ground-wheels 9.

Near the middle of the frame-bar 4 is secured at each side of it a serrated sector-plate 10, in which there is a vertical slot 11, (see Figs. 2 and 4,) enlarged at its upper end 12 to permit the insertion of the head 13 of the shaft 14, which has a neck 15, adapted to rest in the lower and narrow end of the slot as its journal-box, while the outer end of the shafts 14 are carried by the ground-wheels 16. I prefer to form said shafts 14 and the heads 13 in the manner shown in Fig. 4—that is, 14 is a tube having secured in it by the pin 18 a cast or malleable plug 17, on which is formed integrally the neck 15, head 13, and arm 19, to which is secured the lever 20 with the latch 21, rod 22, and sliding dog 23, adapted to interlock with the serrations in the sector 10.

Upon the two shafts 14 are adjustably secured by the set-screws 24 the collars 25, having horizontal arms 26, connected by chains or links 27 to the side sections 28 of the drag, which sections are also secured to the draft-bar 1 by the links 30. Similar links $30^{\times}$ connect with the draft-bar the middle section 29 of the drag. The latter section is suspended by the links $27^{\times}$ and arms $26^{\times}$, adjustably held by set-screws on the rock-shaft $14^{\times}$, journaled in the front ends of the sector-plates 10 and carrying a hand-lever $20^{\times}$, having a latch-operated dog, the same as the lever 20 in Fig. 4, engaging a serrated sector $10^{\times}$, secured on the frame-bar 4 forward of the shafts 14.

31 represents diagonal braces from the frame-bar to the draft-bar, and 32 represents longitudinal braces secured to the draft-bar by bolts and thumb-nuts 33 with their front ends and having their rear ends journaled on the shafts 14, preferably by simply being hooked over the shaft between the collars 34. The braces 31 and 32 are offset upwardly, as at 35 in Figs. 2 and 3, to permit the sections of the harrow to be elevated by the arms 26 $26^{\times}$ and shafts 14 and $14^{\times}$ and hand-levers 20 $20^{\times}$ when so desired in transportation of the harrow or in releasing each section from obstructions of any kind.

In further alluding to the use of this drag or harrow it will be understood that the collars 25 $25^{\times}$ may be moved to any desired places on the shafts, and thus permit the links 27 $27^{\times}$ to be connected to harrow-sections of various sizes and types, and that the dividing of the shaft 14 $14^{\times}$ into three sections, each provided with a hand-lever and adjacent locking-sector, enables the operator to raise each section of the harrow independently of the other sections.

In Fig. 2, 36 designates harrow-teeth, the shape and size and number of which may be varied as desired, as may also be the rock-shafts with their levers and the sections of the harrow itself. 37 is a driver's seat supported by the spring-arm 38, secured to the frame-bar 4.

Having thus described my invention, what

I claim, and desire to secure by Letters Patent, is—

1. A harrow comprising in combination, a series of harrow-sections adapted to be drawn side by side, a draft-bar link-fastened to the front ends of all the sections, a frame-bar secured with its front end to the middle of the draft-bar and extending upwardly and rearwardly over and beyond the harrow-sections, a driver's seat secured on the frame-bar, a horizontally-swinging arm pivoted under the rear part of the frame-bar and having a transversely-disposed short shaft with carrier-wheels at its ends; the serrated sectors 10, secured at both sides of the frame-bar, rock-shafts 14 extending transversely out from both sides of the frame-bar, near the sector-plates and journaled central with the latter, and carrying levers having latch-operated dogs adapted to engage the serrations of the sectors, ground-wheels 16 supporting the outer ends of the shafts 14, and adjustable arms, 26, link-fastened to the harrow-sections, and the braces 32 between the draft-bar and the shafts 14, substantially as and for the purpose set forth.

2. A harrow having a longitudinally-disposed elongated supporting-frame with a horizontally-swinging arm pivoted with its front end under the rear end of the frame, and provided at its rear end with a short axle having two ground-wheels traveling behind the harrow-sections.

3. In a harrow, the combination with a supporting-frame having the sector-plates 10 with serrations and each with a central vertical slot enlarged at its upper end, of the side shaft 14 having the neck 15 and head 13 and latch-lever with dog adapted to engage the serrations of the sector when the neck of the shaft is journaled in the narrow bottom end of the slot, and wheels supporting the outer ends of the shafts.

4. A harrow-frame having side bearings for side shafts to extend in opposite directions from the frame, and shafts journaled each with one end in such bearings, said journals consisting of an annular groove formed near the end of the shaft, and said bearing consisting of a plate having a vertically-elongated hole enlarged at its upper end for the insertion of the end of the shaft till its neck can be placed in the narrow bottom end of the slot which serves as its bearing.

In testimony whereof I affix my signature in presence of two witnesses.

EDMUND RANDEL BUTTS.

Witnesses:
W. G. WILLSON,
B. F. WHITE.